United States Patent

[11] 3,604,293

[72] Inventors Gerhard Foll;
  Helmut Link, both of Esslingen, Germany
[21] Appl. No. 758,738
[22] Filed Sept. 10, 1968
[45] Patented Sept. 14, 1971
[73] Assignee Index-Werke K. G. Hahn & Tessky
  Esslingen/Neckar, Germany
[32] Priority Sept. 14, 1967
[33] Germany
[31] P 16 02 839.0

[54] MACHINE TOOL
  10 Claims, 6 Drawing Figs.
[52] U.S. Cl. ................................................... 82/24
[51] Int. Cl. ................................................ B23b 21/00
[50] Field of Search .......................................... 82/24, 3

[56] References Cited
UNITED STATES PATENTS
| | | | |
|---|---|---|---|
| 1,877,922 | 9/1932 | Lovely.......................... | 82/2 |
| 1,950,039 | 3/1934 | Smith et al..................... | 82/24 |
| 2,187,682 | 1/1940 | Drissner........................ | 82/3 X |
| 2,372,692 | 4/1945 | Svenson........................ | 82/2 |
| 2,573,101 | 10/1951 | Hansen.......................... | 82/2 |
| 2,606,359 | 8/1952 | Stadthaus....................... | 82/3 X |

Primary Examiner—Leonidas Vlachos
Attorney—Michael S. Striker

ABSTRACT: A turning lathe wherein the headstock for the work spindle mounts at least one first support. The first support is reciprocable in parallelism with the axis of the work spindle or is pivotable about an axis which is parallel to the axis of the work spindle. Such first carriage supports a second support which is movable thereon substantially or exactly at right angles to a line extending radially from the work spindle and in the general direction of the second support. A cross-slide is mounted in the second support for movement radially of the work spindle and can be shifted by a piston which is reciprocable in the housing of the second support.

Inventor:
GERHARD FÖLL
HELMUT LINK
By: Michael S. Striker
Attorney

3,604,293

MACHINE TOOL

BACKGROUND OF THE INVENTION

The present invention relates to machine tools in general, especially to automatic turning lathes. More particularly, the invention relates to improvements in the mounting, design and manipulation of supports in a turning lathe or a like machine tool.

Supports of conventional turning lathes are normally movable in parallelism with and radially of the work spindle. Thus, the position of a tool which is carried by the support cannot be changed in a direction at right angles to the axis of the work spindle and at right angles to the line extending radially from the axis of the work spindle toward the tool. This means that the operator must change the position of the tool on the support whenever it becomes necessary to adjust the tool in a sense other than radially or axially of the work spindle. Such adjustments are time-consuming and normally involve placing of one or more shims between the cross-slide and the support. It is also known to mount the cross-slide for movement with reference to the support and to provide means for fixing the cross-slide in selected position. This contributes significantly to the initial cost of the cross-slide and restricts its application to use in machine tools wherein the supports are provided with adjusting means for such cross-slides.

SUMMARY OF THE INVENTION

It is an object of our invention to provide a machine tool, particularly an automatic turning lathe, with one or more novel and improved supporting assemblies which permit adjustments of tools in more than two directions and wherein the cross-slides need not be moved with reference to their supports in order to effect adjustment of tools in such cross-slides in any one of more than two directions with reference to the work spindle.

Another object of the invention is to provide a simple, compact and versatile supporting assembly which can be utilized in a turning lathe or a like machine tool wherein the workpiece is held in the chuck of a work spindle or the like and the tools are fed radially or nearly radially toward the axis of the work spindle.

A further object of the invention is to provide novel means for properly centering and fixing the angular position of a cross-slide in the improved supporting assembly.

An additional object of the invention is to provide a machine tool with two more more novel supporting assemblies and to construct the supports of the assemblies in such a way that a cross-slide can be used with the same advantage in each of the supports and can be readily transferred from one support to another.

Still another object of the invention is to provide a supporting assembly which occupies relatively little room, which can be mounted on the headstock for the work spindle in a novel way, and which can accept conventional as well as specially designed cross slides.

The improved machine tool comprises a frame member, a work spindle rotatably mounted in the frame member, preferably for rotation about a horizontal axis, a first support mounted on the frame member for pivotal movement about an axis which is parallel to the axis of the work spindle or for reciprocatory movement in parallelism with the axis of the work spindle, a second support mounted on the first support for movement with or relative to the first support in a plane which is normal to the axis of the work spindle and substantially at right angles to a line which extends radially from the work spindle in the general direction of the second support, a cross-slide mounted in the second support, and means for moving the cross-slide with reference to the second support substantially radially of the work spindle. The cross-slide and the second support are preferably provided with means for centering the cross-slide in the second support and with means for fixing the cross-slide in any one of two or more angular positions with reference to the second support.

If the first support is pivotable about an axis which is parallel to the axis of the work spindle, the second support is movable with reference to the first support in parallelism with the axis of the work spindle. If the first support is reciprocable in parallelism with the axis of the work spindle, the second support is movable at right angles to the direction of movement of the first support.

The novel features which are considered as characteristic of the invention are set forth in particular in the appended claims. The improved machine tool itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
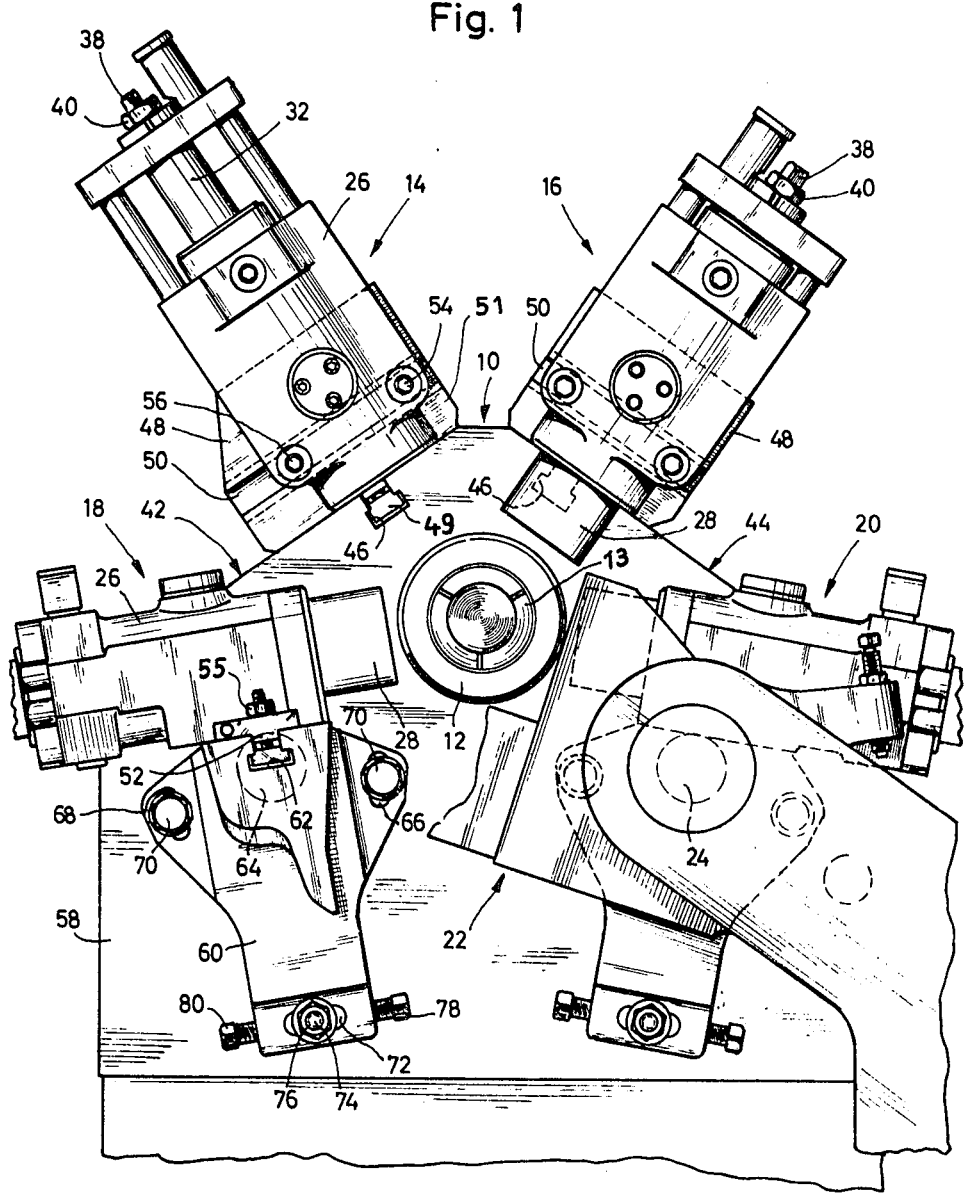
FIG. 1 is an end elevational view of the working station in a turning lathe and of four supporting assemblies which embody two forms of our invention.
Figure 2:
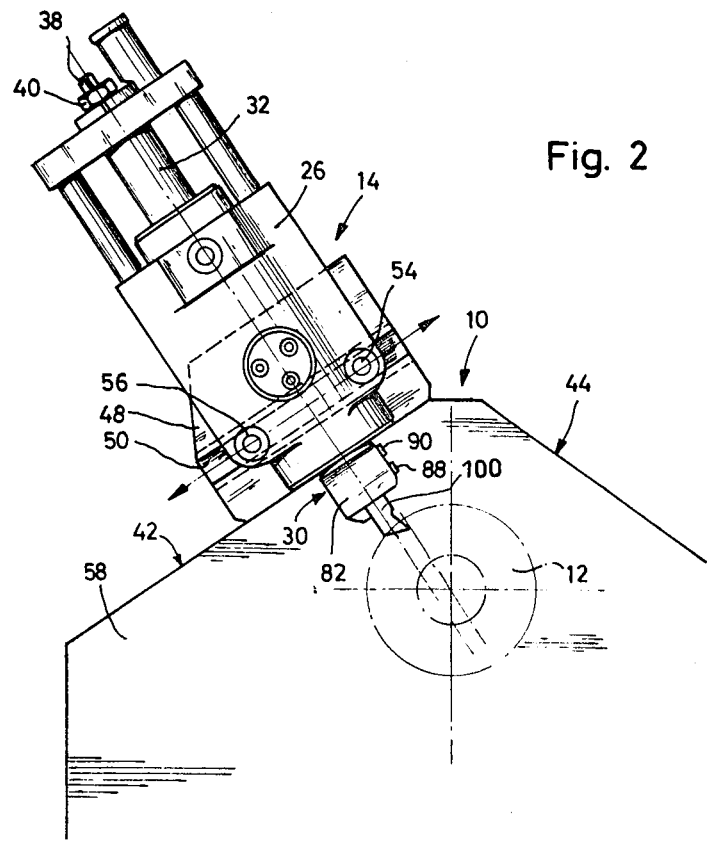
FIG. 2 is a similar view of one of the supporting assemblies in the turning lathe, further showing a turning tool which is mounted in the cross-slide.

FIG. 1 illustrates the working station of a turning lathe. A frame member or headstock 10 serves as a carrier for a work spindle 12 which is rotatable about a horizontal axis extending at right angles to the plane of FIG. 1. The working station further accommodates four supporting assemblies which are denoted by numerals 14, 16, 18 and 20. The supporting assemblies 14, 16 and 18, 20 are respectively of identical construction. A feature common to all of the supporting assemblies is that a tool (e.g., the tool 100 shown in FIGS. 2, 5 and 6) can be moved in three different directions with reference to the work spindle 12 without necessitating its displacement or the displacement of its cross-slide (e.g., the cross-slide 30 of FIGS. 2, 5 and 6) with reference to the corresponding second support. FIG. 1 further shows a main slide 22 which is movable along a shaft 24 extending in parallelism with the axis of the work spindle 12. The main slide 22 can carry one or more tools (not shown) which can be moved in the axial direction of the work spindle to treat a workpiece which is held in the chuck 13. The main slide 22 is also pivotable on the shaft 24.

Each of the supporting assemblies 14, 16, 18, 20 comprises a second support and all of the four cross-slides are of identical design. In other words, the second support of the assembly 14 can be used in the supporting assembly 16, 18 or 20, or vice versa. Each second support comprises a housing 26 which constitutes a double-acting hydraulic or pneumatic cylinder and accommodates a reciprocable piston (not shown) having a first piston rod 28 (see also FIG. 5) which serves to receive and to retain a cross-slide 30, and a second piston rod 32. The piston rods 28 and 32 respectively extend beyond the front and rear ends of the housing 26 and the piston rod 32 resembles a tube which receives a shaft 34 (FIG. 5) which extends through the piston and has a hollow front end portion or sleeve 36 which is received in the piston rod 28 and can be coupled to the cross-slide 30. The rear end portion of the shaft 34 is of polygonal outline, as at 38, so that it can be engaged and rotated by a wrench or the like. A locknut 40 is provided to fix the shaft 34 in selected axial position. The manner in which the piston which includes the piston rods 28, 32 can be moved by a hydraulic or pneumatic fluid which is admitted to one of the cylinder chambers at a time is well known and forms no part of the present invention. This piston constitutes with the piston rods 28, 32 a means for moving the tool 100 and the cross-slide 30 radially of the workpiece which can be held by the chuck 13 of the work spindle 12.

Each of the supporting assemblies 14, 16 further comprises a guide member or first support 48 which is adjustably mounted on the frame member 10 so that it is movable in parallelism with the axis of the work spindle 12. As shown in FIG. 1, the frame member 10 is provided with two mutually inclined top surfaces 42, 44 which are parallel to the axis of the work spindle 12 and are formed with T-grooves 46 extending in parallelism with the work spindle. Each first support 48 is provided with one or more bolts 49 whose heads extend into the corresponding T-grooves 46 and which can be tightened to thus fix the respective first supports 48 at a desired distance from the chuck 13. The first supports 48 have vertical surfaces 51 which are normal to the top surfaces 42, 44 and to the axis of the work spindle 12, and each surface 51 is formed with an elongated T-groove 50 which is normal to the axis of and extends in parallelism to a tangent to the work spindle 12. It can be said that each T-groove 50 makes an angle of 90° with a line which extends radially from the axis of the work spindle 12 and in the general direction of the corresponding second support (housing 26). The housings 26 carry bolts similar to the bolts 49 and extending into the respective T-grooves 50. These bolts can be tightened to thus fix the housing 26 to the corresponding first supports 48 in selected positions whereby the axes of the cross-slides 30 in the supporting assemblies 14, 16 may intersect the axis of the work spindle 12 or are located to the right or to the left and thus cross in space the axis of the work spindle. It will be seen that the tools 100 in the cross-slides 30 can be adjusted transversely of the work spindle 12 and chuck 13 without necessitating any displacement of tools 100 with reference to the second supports (housings 26) and also without requiring any displacement of cross-slides 30 with reference to such housings. All transverse adjustments of tools 100 can be effected by loosening the bolts which extend into the T-grooves 50 and by moving the housings 26 with reference to the respective first supports 48. Screws 54, 56 can be applied to fix the housings 26 in selected positions with reference to their first supports 48.

The housings 26 of the supporting assemblies 18 and 20 are mounted on modified first supports 60. These first carriages are pivotable on shafts 64 which are parallel to the work spindle 12 and extend into the working station from a side surface or transverse surface 58 of the frame member. This transverse surface is located in a vertical plane and makes an angle of 90° with the axis of the work spindle 12. Each first support 60 is formed with a T-groove 62 which extends in parallelism with the spindle 12 and receives the head or heads of one or more bolts 52 which are mounted in the corresponding housing 26. The bolts 52 mesh with nuts 55 (see FIG. 1) so that they can be tightened to thus prevent any movement of housings 26 with reference to their first supports 60. The planes in which the first supports 60 are pivotable are parallel to the side surface 58 and are thus normal to the axis of the work spindle 12. The directions in which the second supports including the housings 26 of the supporting assemblies 18, 20 move in response to turning of first supports 60 about the axes of their shafts 64 are again substantially normal to lines which extend radially outwardly from the axis of the work spindle 12 and in the general direction of the respective second supports.

The means for releasably locking the first supports 60 against pivotal movement with reference to their shafts 64 comprises two bolts 70 which extend through arcuate slots 66, 68 of the corresponding first supports 60 and mesh with the frame 10. When the bolts 70 are loosened, the first supports 60 can be pivoted on the shafts 64; the bolts 70 are thereupon driven home to thus fix the first carriages in selected angular positions. For precision adjustment of angular positions of supports 60, these first carriages are formed with additional arcuate slots 72 for the stems of bolts 74 whose heads are anchored in the frame member 10. Each of the bolts 74 meshes with a nut 76 and each first support 60 further supports two adjusting screws 78, 80 which are coaxial with each other and engage the stem of the respective bolt 74 from opposite sides. The screws 78, 80 allow for precise adjustments in the angular position of first supports 60 with reference to their shafts 64. Such precise adjustments are necessary in order to place the cutting edge or tip of a tool into an accurately determined position with reference to the workpiece in the chuck 13.

Figure 3:
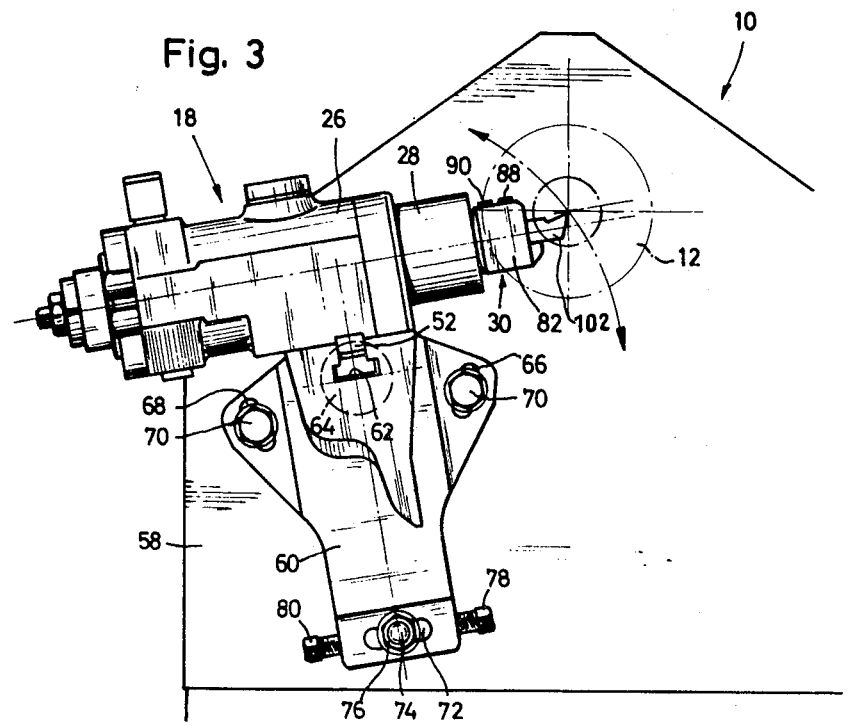
FIG. 3 is a similar view of another supporting assembly in the turning lathe, a fresh tool being shown in the cross-slide.
Figure 4:
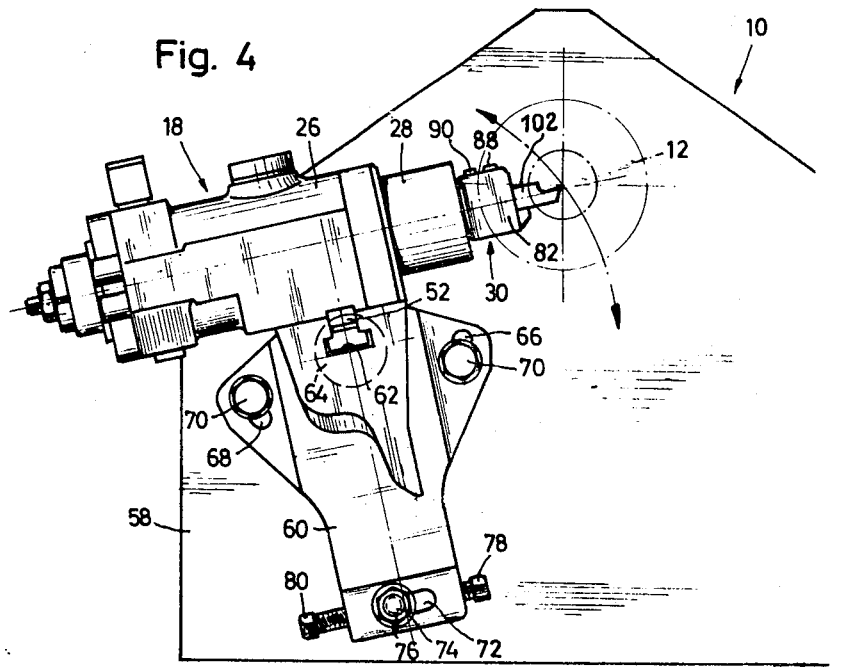
FIG. 4 is a similar view of the other supporting assembly in a different position with reference to the work spindle.

FIG. 3 illustrates a fresh turning tool 102 which is held in the cross-slide 30 of the supporting assembly 18 and is positioned in such a way that its cutting edge is located on the axis of the work spindle 12. FIG. 4 illustrates the tool 102 after it has undergone considerable wear so that it was necessary to change the angular position of the first support 60 with reference to the shaft 64 in order to maintain the cutting edge of the worn tool 102 in the same position as the cutting edge of the fresh tool shown in FIG. 3. The inclination of the tool 102 in FIG. 4 is practically the same as the inclination of the tool shown in FIG. 3. This is due to the novel mounting of housings 26 on first supports 60 which are pivotable on their shafts 64 in planes making a right angle to the axis of the work spindle 12.

Figure 5:
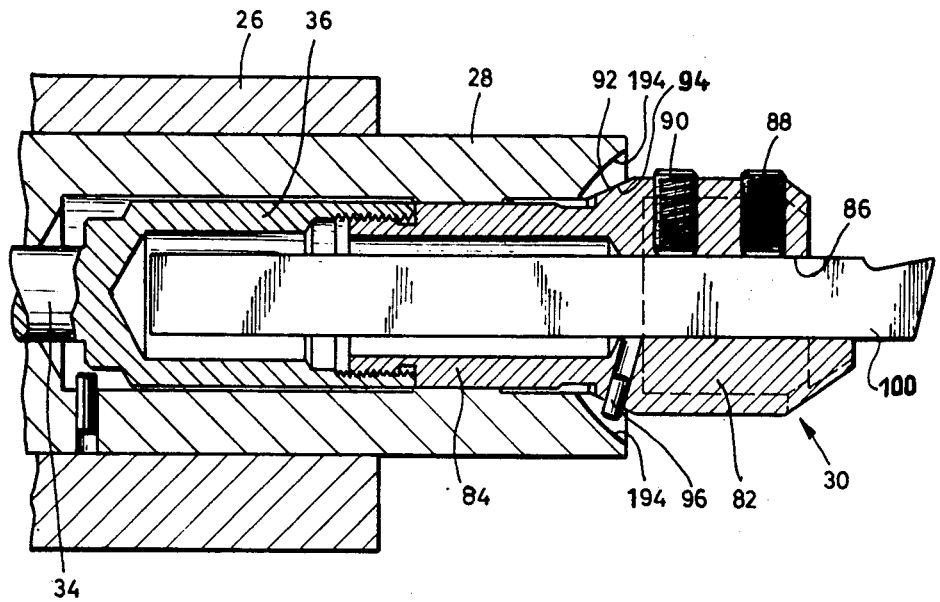
FIG. 5 is an enlarged axial sectional view of a cross-slide taken in the plane of FIG. 2 or as seen in the direction of arrows from the line 5—5 of FIG. 6.
Figure 6:
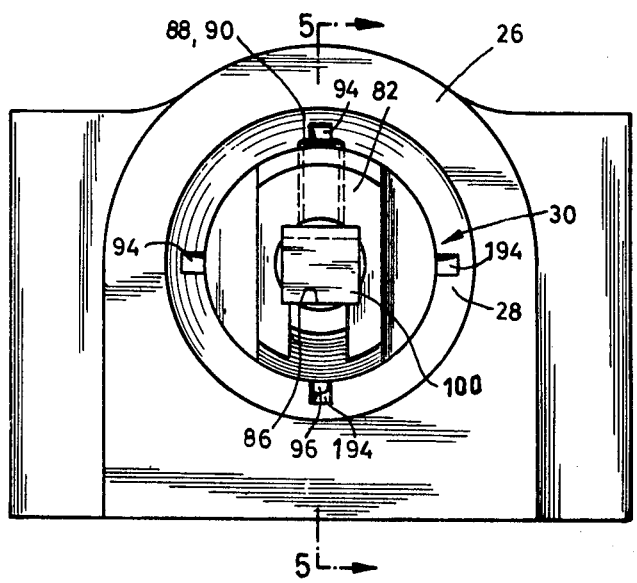
FIG. 6 is an end elevational view of the cross-slide as seen from the right-hand side of FIG. 5.

Each cross-slide 30 comprises a gripping head 82 which is located at the forward end of a cylindrical sleeve 84 (see FIG. 5). The head 82 is provided with a suitable recess or socket 86 for the stem of the tool 100 and carries two radial locking screws 88, 90 whose outer ends are formed with polygonal recesses for the working ends of suitable screwdrivers. The stem of the tool 100 can extend inwardly beyond the sleeve 84 of the cross-slide 30. The inner end of the sleeve 84 is provided with external threads meshing with internal threads at the forward end of the sleeve 36 on the shaft 34. The means for centering the cross-slide 30 with reference to the housing 26 comprises a conical external surface 92 provided on the cross-slide in the region between its head 82 and sleeve 84 and a complementary conical internal surface 94 in the forward end of the piston rod 28. Both conical surfaces taper in a direction away from the head 82. The conicity of the surfaces 92, 94 should be rather pronounced to avoid jamming of the head 82 in the piston rod 28.

The piston rod 28 further carries means for fixing the cross-slide 30 in selected angular positions. To this end, the internal surface 94 is formed with groovelike recesses or cutouts 194 and the cross-slide 30 carries a radial post or stud 94 which can extend outwardly from the conical external surface 92. For example, the cross-slide 30 can be mounted in the angular positions of FIG. 6 and in a second angular position subsequent to rotation through 180°. This renders it possible to employ the tool 100 for right-hand or left-hand operation.

It is clear that the position of mating threads on the sleeves 36, 84 can be reversed, i.e., that the sleeve 36 may be provided with external threads mating with internal threads at the inner end of the sleeve 84. It is also clear that the post 96 can be mounted on the piston rod 28 and that the head 82 and/or the sleeve 84 of the cross-slide 30 is then provided with several angularly spaced cutouts which correspond to cutouts 194 and one of which receives the post 96 to thus fix the cross-slide in selected angular position.

It is further clear that the machine tool shown in FIG. 1 can comprise one, two, three, five or more supporting assemblies and that all of the supporting assemblies may be of identical design. In other words, the housing of each second support can be mounted on a first support 48 or on a first carriage 60.

What is claimed as new and desired to be protected by Letters Patent is set forth in the appended claims.

1. In a machine tool, particularly in a turning lathe, a combination comprising a frame member; a work spindle rotatably mounted in said frame member; a first support mounted on said frame member; a second support mounted on said first support for movement in a first plane normal to the axis of said spindle, said second support being movable along a straight path in said plane substantially at right angles to a line extending radially from said spindle in the general direction of said second support; a cross-slide mounted on said second support for movement in a second plane normal to said first plane, said cross-slide being movable along a straight path substantially radially of said spindle; and means for moving said cross-slide relative to said second support.

2. A combination as defined in claim 1, wherein said first support is movable with reference to said frame in substantial parallelism with the axis of said work spindle.

3. A combination as defined in claim 1, wherein said second support is movable with reference to said first support in parallelism with the axis of said work spindle.

4. A combination as defined in claim 1, wherein said second support is reciprocable with reference to said first support exactly at right angles to said line.

5. A combination as defined in claim 1 wherein said second support and said first support are pivotable on said frame member about an axis which is parallel to the axis of said work spindle.

6. A combination as defined in claim 1, further comprising means for fixing said cross-slide in a predetermined angular position with reference to said second support.

7. A combination as defined in claim 1, wherein said work spindle has a substantially horizontal axis and wherein said frame member has a surface provided with a T-groove extending in parallelism with said horizontal axis and reciprocably receiving a portion of said first support.

8. A combination as defined in claim 1, wherein said second support comprises a cylinder, a piston rod reciprocable in said cylinder substantially radially of said work spindle and having a tubular front end portion engaging with a tubular rear portion of said cross-slide, said cross-slide further having a tool-engaging head outwardly adjacent to said rear portion and an external conical centering surface engaging a complementary internal conical centering surface on said piston rod.

9. A combination as defined in claim 6, wherein said second support comprises a hollow piston rod reciprocable substantially radially of said work spindle and accommodating a tubular rear portion of said cross-slide, said piston rod having an internal surface and said cross-slide having an external surface and said fixing means comprising a plurality of angularly spaced recesses provided in one of said surfaces and a projection provided on the other surface and extending into one of said recesses.

10. A combination as defined in claim 1, wherein said first support is reciprocable in parallelism with the axis of said work spindle and wherein said second support is reciprocable on said first support at right angles to the direction of reciprocation of said first support, and further comprising an additional first support supported by said frame member for pivotal movement about an axis which is parallel to the axis of said spindle, an additional second support reciprocably supported by said additional first support for movement in parallelism with the axis of said spindle, a second cross-slide movable in said additional second support substantially radially of said work spindle, and means for reciprocating said second cross-slide with reference to said additional second support.